(12) United States Patent
Ufheil et al.

(10) Patent No.: US 7,562,793 B2
(45) Date of Patent: Jul. 21, 2009

(54) DISPENSING DEVICE WITH SELF-CLEANING NOZZLE

(75) Inventors: Gerhard Ufheil, Bern bei Muri (CH); Balakrishna Reddy, Ridgefield, CT (US); Richard Farrell, New Milford, CT (US)

(73) Assignee: Nestec S.A., Vevey (CH)

( * ) Notice: Subject to any disclaimer, the term of this patent is extended or adjusted under 35 U.S.C. 154(b) by 487 days.

(21) Appl. No.: 11/054,214

(22) Filed: Feb. 8, 2005

(65) Prior Publication Data
US 2006/0213928 A1 Sep. 28, 2006

(51) Int. Cl.
*B67D 1/08* (2006.01)
(52) U.S. Cl. ............... 222/148; 222/129.1; 222/149; 239/104; 239/106
(58) Field of Classification Search ............. 222/129.1, 222/149, 148; 239/104, 106, 107, 112
See application file for complete search history.

(56) References Cited

U.S. PATENT DOCUMENTS

| 739,788 | A | 9/1903 | Morcom et al. |
|---|---|---|---|
| 924,566 | A | 6/1909 | Morcom |
| 4,331,299 | A | 5/1982 | Culbertson et al. |
| 4,465,210 | A | 8/1984 | Iwanami |
| 4,848,381 | A | 7/1989 | Livingston et al. |
| 5,226,565 | A | 7/1993 | Hladis et al. |
| 5,344,073 | A | 9/1994 | Waryu et al. |
| 5,503,064 | A | 4/1996 | Scheel et al. |
| 5,503,179 | A | 4/1996 | Till |
| 5,783,245 | A | 7/1998 | Simpson, II |
| 5,855,295 | A | 1/1999 | Lee |
| 6,024,252 | A | 2/2000 | Clyde |
| 6,161,558 | A | 12/2000 | Franks et al. |
| 6,240,952 | B1 | 6/2001 | Schroeder |
| 6,287,515 | B1 | 9/2001 | Koosman et al. |
| 6,446,659 | B2 | 9/2002 | Schroeder |
| 6,564,698 | B2 | 5/2003 | Rolland |
| 6,682,002 | B2 * | 1/2004 | Kyotani ............... 239/318 |
| 2002/0074350 | A1 | 6/2002 | Jones et al. |
| 2003/0201337 | A1 | 10/2003 | Carhuff et al. |
| 2004/0001906 | A1 | 1/2004 | Carhuff et al. |
| 2004/0118291 | A1 * | 6/2004 | Carhuff et al. ........... 99/275 |

FOREIGN PATENT DOCUMENTS

| DE | 94 01 472.8 | 5/1994 |
|---|---|---|
| DE | 199 55 195 | 5/2001 |
| EP | 0 245 641 | 11/1987 |
| EP | 0 579 051 | 1/1994 |
| EP | 1688388 A1 * | 8/2006 |
| FR | 2 649 687 | 1/1991 |
| GB | 2 367 105 | 3/2002 |
| WO | WO2004/0058020 | 1/2007 |

\* cited by examiner

*Primary Examiner*—Frederick C. Nicolas
(74) *Attorney, Agent, or Firm*—K&L Gates LLP

(57) ABSTRACT

The present invention is directed to beverage dispensers and more specifically to a beverage dispensing nozzle that provides a short and direct beverage pathway. The nozzle is adapted for use in a self-cleaning assembly that provides for efficient cleaning of all of its surfaces that contact beverage products. The nozzle can be configured with an inlet port that provides a relatively direct product flow pathway from a beverage mixing chamber in the dispenser.

14 Claims, 3 Drawing Sheets

DISPENSING DEVICE WITH SELF-CLEANING NOZZLE

BACKGROUND OF THE INVENTION

In the restaurant industry beverages that require mixing are often prepared by beverage dispensers which quickly add two or more ingredients together in a mixing bowl, mix these ingredients and dispense the mixed product. Concentrated beverages, and/or syrups and dairy products can be mixed and, under some circumstances, are whipped into a foam, and then dispensed through a nozzle which dispenses the beverage for consumption by the consumer. The dispensing nozzle, as well as the remainder of the surfaces that contact the product in a beverage dispenser, require regular cleaning to prevent the build up of food deposits. Cleanliness is all the more important when the beverages include dairy products because residual amounts of dairy products encourage bacterial growth and quickly decompose into poor tasting, inedible products having a putrid smell.

After a certain amount of use, solid residues accumulate in dispensing machines, particularly in the nozzle. This build up can alter the taste and/or quality of dispensed beverages and can disrupt beverage supply thereby reducing or terminating the flow of product. Consequently, dispensing machines must be cleaned. However, maintenance operations reduce the efficiency of dispensing machines which are often taken out of service for the amount of time required to clean them.

Beverage dispensers have been designed that provide for cleaning of nozzles such that they can be rinsed and/or cleaned while they remain in-place in the beverage dispenser. US 2004/0118291, which is incorporated herein by reference, describes an automated food product dispenser comprising an interface connection configured to establish a supply of a milk-based fluid from a reservoir (for example a container or bag), a mixing device configured to receive the milk-based fluid (e.g., a milk liquid concentrate) and prepare a milk-based product (e.g., a cappuccino or latte type beverage), a nozzle in fluid association with the mixing device for dispensing the milk based product, a product flowpath configured for directing the milk-based product to flow from the interface connection through the mixing device to the nozzle, and a clean-in-place flowpath assembly. The device also includes a supply of cleaning or sanitizing fluid and a cleaning solution flowpath, which is configured to deliver the cleaning or sanitizing fluid so that it can pass through and clean the product flowpath. To maintain the dispenser in a sanitized state, the product flowpath and surfaces that contact the beverage components are routinely cleaned by flushing those surfaces with cleaning fluids at periodical intervals.

Although such a system provides for improved cleanliness, additional improvements that can potentially clean the dispenser more thoroughly and that can potentially reduce the risk of microbial contamination and/or growth even further are always desirable and sought after.

Another important aspect of a beverage dispenser nozzle is the flow pathway required to bring the mixed beverage product through the dispenser. This is particularly important for whipped foam products. In beverage dispensers a beverage is typically mixed in a mixing bowl and passes through the bowl passed a whipper which generates a foam. The foam often travels a tortuous path that winds around the dispensing machine through a piston to the dispensing head where it takes one last 180 degree bend and is dispensed through an outlet for consumption. Such a flow pathway is lengthy and contains numerous turns which cause the buildup of air pockets in the product pathway as the foam is gradually disrupted along the pathway. In addition, such a pathway provides numerous locations for food deposits to accumulate and bacteria to grow. Thus, new nozzle compositions that provide short pathways for delivering mixed beverage products, particularly foam products, are needed. Such compositions could be used to deliver higher quality foam products to consumers.

SUMMARY OF THE INVENTION

The present invention is directed to a beverage dispenser and more specifically to a beverage dispensing nozzle within the dispenser that provides a short and direct beverage pathway. The nozzle is adapted for use in a self-cleaning assembly that provides for efficient cleaning of the surfaces that contact beverage components. The nozzle can be configured with a conduit having an inlet port that provides a relatively direct product flow pathway from a beverage mixing chamber in the dispenser to the dispenser head. Preferably, the beverage pathway through the dispensing head is substantially straight.

In an embodiment, the nozzle assembly comprises a dispensing head and a cylinder wherein at least one of the two elements is moveable relative to the other for providing a dispensing position and a cleaning position. In the dispensing position, beverages are delivered through a liquid flow path to a beverage delivery outlet. In the cleaning position, the liquid flowpath is diverted to at least one drain port for draining liquid such as a cleaning or rinsing solution through the beverage delivery outlet.

The nozzle assembly includes an actuator, a cylinder, a piston and a dispensing head. The cylinder can be mounted to the actuator and the piston and dispensing head can be joined in an assembly that is housed within the cylinder. The actuator is capable of moving the cylinder with respect to the piston and dispensing head assembly to position the dispensing head in either of at least two positions. In one position the dispensing head is in a dispensing position in which beverage is dispensed. In another position, the dispenser head is in a cleaning position in which the dispensing head can be rinsed clean with a cleaning solution. The dispensing head can be connected to the outlet of a mixing bowl through a tube.

In an embodiment, the nozzle includes an inlet port on the dispensing head. The inlet port can be connected to a tube in connection with an outlet port of a whipping assembly wherein the connections are substantially free of fluid leaks. In an embodiment, the tube connector is rigid and can be made of rigid materials, such as hard plastics or stainless steel.

In an embodiment, the dispensing head of the nozzle includes an outlet port.

In an embodiment, the piston in the nozzle is fastened to a frame in the dispensing machine. In this configuration an actuator can move the cylinder in two positions such that the dispensing head can be opened into a dispensing position or can be in a closed configuration for cleaning the dispensing head. In the open position, the dispensing head is free to pour a food beverage into a receiving vessel for consumption. In the closed position, the dispensing head is positioned such that liquid moves through a cleaning fluid system that can recirculate or drain cleaning fluids after they pass through the food dispenser.

In an embodiment, the nozzle cylinder has at least one port through which a liquid such as a cleaning fluid can flow. In an alternate embodiment, the cylinder has at least two such ports.

In an embodiment, the dispensing head of the nozzle includes an inlet and an outlet and defines a channel from the inlet to the outlet port through which fluid can flow. Preferably, the channel through the dispensing head is substantially direct or straight.

In an embodiment, a rigid conduit passes through the dispensing head and extends upwardly beyond the dispensing head. Preferably the extension has a bend of no less than about 90° which facilitates a fluid connection to the whipping assembly.

In an embodiment, the invention includes a dispensing device that includes the nozzle of the invention.

In an embodiment, the nozzle comprises a dispensing head with a beverage delivery outlet and a cylinder; wherein at least one of said head or cylinder is moveable relative to the other for encompassing, in a cleaning position, the product outlet and diverting the flowpath to at least one drain port for draining liquid; wherein the dispensing head is traversed by a portion of beverage conduit from the top of the head to the bottom of the head up to the product outlet.

In an embodiment, the beverage conduit is substantially straight from the top to the bottom of the dispensing head. In an embodiment, the cylinder comprises two drain conduits which are vertically spaced one another.

Additional features and advantages of the present invention are described in, and will be apparent from, the following Detailed Description of the Invention and the figures.

DETAILED DESCRIPTION OF THE INVENTION

The present invention is directed to dispensing devices and methods of dispensing beverages. The present invention is specifically directed to a nozzle for dispensing beverages from a beverage dispenser. The nozzle provides a short and direct flow pathway that can be cleaned efficiently and offers a fluid inlet port that provides for a more direct, less tortuous, product flow pathway from a beverage mixing chamber.

Figure 1:
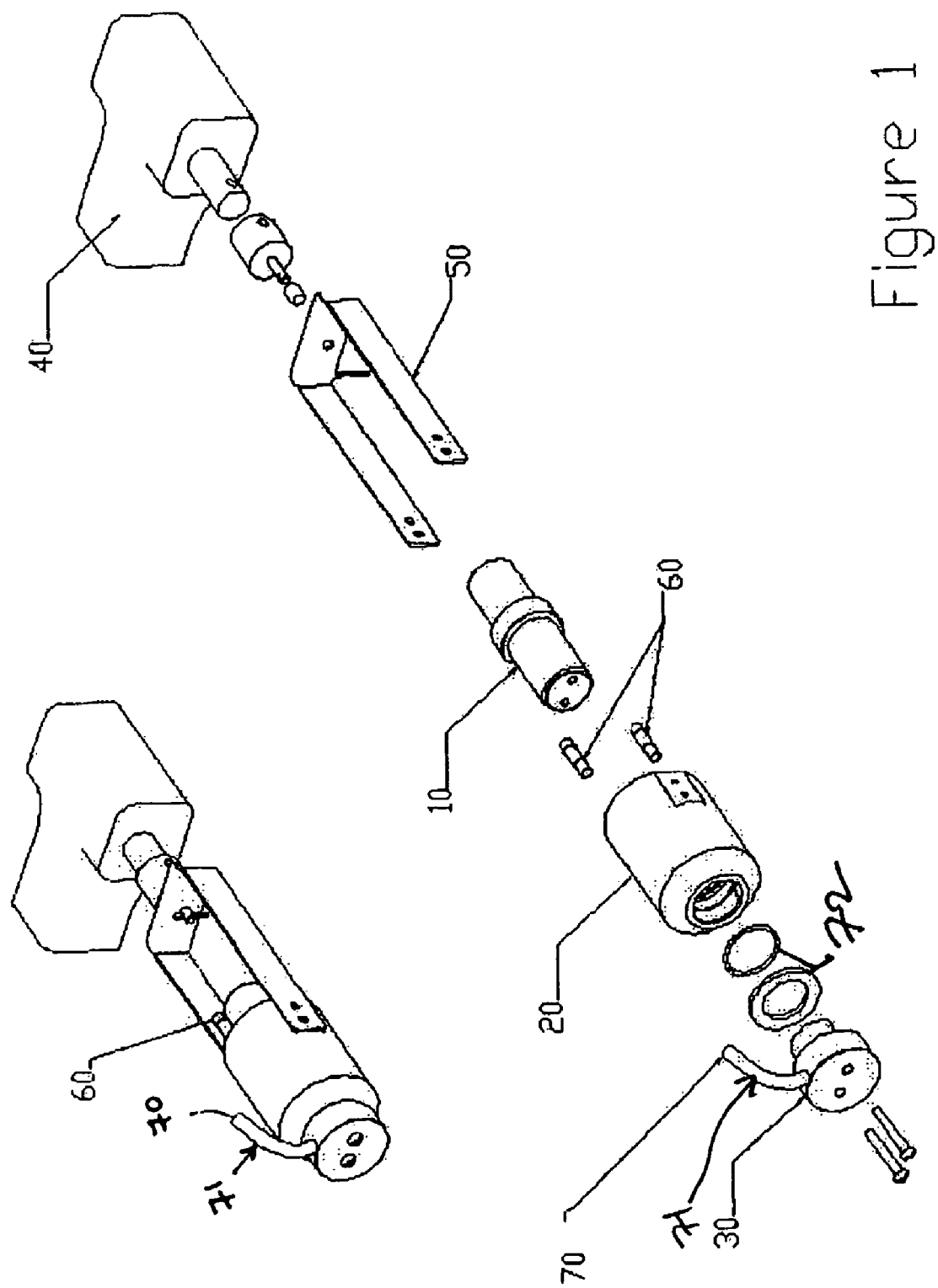
FIG. 1 illustrates a perspective view of an embodiment of the dispensing head of the present invention.

Referring now to the figures and specifically to FIG. 1, a nozzle is provided that includes a piston 10, a cylinder 20, a dispenser head 30, an actuator 40 and fasteners. In an embodiment the cylinder can be mounted to the actuator by mounting bracket 50 and piston 10, and dispensing head 30 can be joined in an assembly that is housed within cylinder 20. Actuator 40 can move cylinder 20 with respect to the assembly to position dispensing head 30 such that the dispensing head can adopt an open, dispensing position in which the liquid food product can be dispensed. In addition, actuator 40 can position the cylinder dispensing head 30 in a closed, cleaning position in which the dispensing head can be rinsed with a cleaning solution and the cleaning solution passed into a fluid line for drainage or recirculation. The dispensing head can also include an inlet port 70, an outlet port 75 and a tube 71 extending from inlet port 70 to an outlet port 75. Outlet port 75 is for dispensing beverage and circulating fluid. Tube 71 is preferably a rigid tube. Tube 71 can be made of any rigid material, including hard plastic or metal, such as stainless steel. Tube 71 can be welded to the body of the head. In the assembled food dispenser, illustrated in FIG. 3, inlet port 70 is in fluid connection with an outlet port of a whipping assembly through a connecting tube 110 which can be flexible or rigid.

In an embodiment, the passageway through the dispenser head from the inlet to the outlet is substantially direct in that it contains no sharp turns. This feature allows dispenser head 30 to be more easily cleaned during cleaning cycles, provides a shorter pathway for the liquid food product and avoids potentially disrupting the foam delivery of foamy beverage products.

In an embodiment, cylinder 20 has one or two holes axially drilled into its wall that create a conduit through which cleaning fluid can pass from the dispensing head, when in the closed position. The holes can be fitted with ports 60 which can be adapted to receive tubing for circulating cleaning fluid. In such embodiments, one port can be used for drainage during clean-in-place cleaning cycles. The second port can be used as an inlet for cleaning fluid flushing or as a secondary drainage port.

Figure 2:
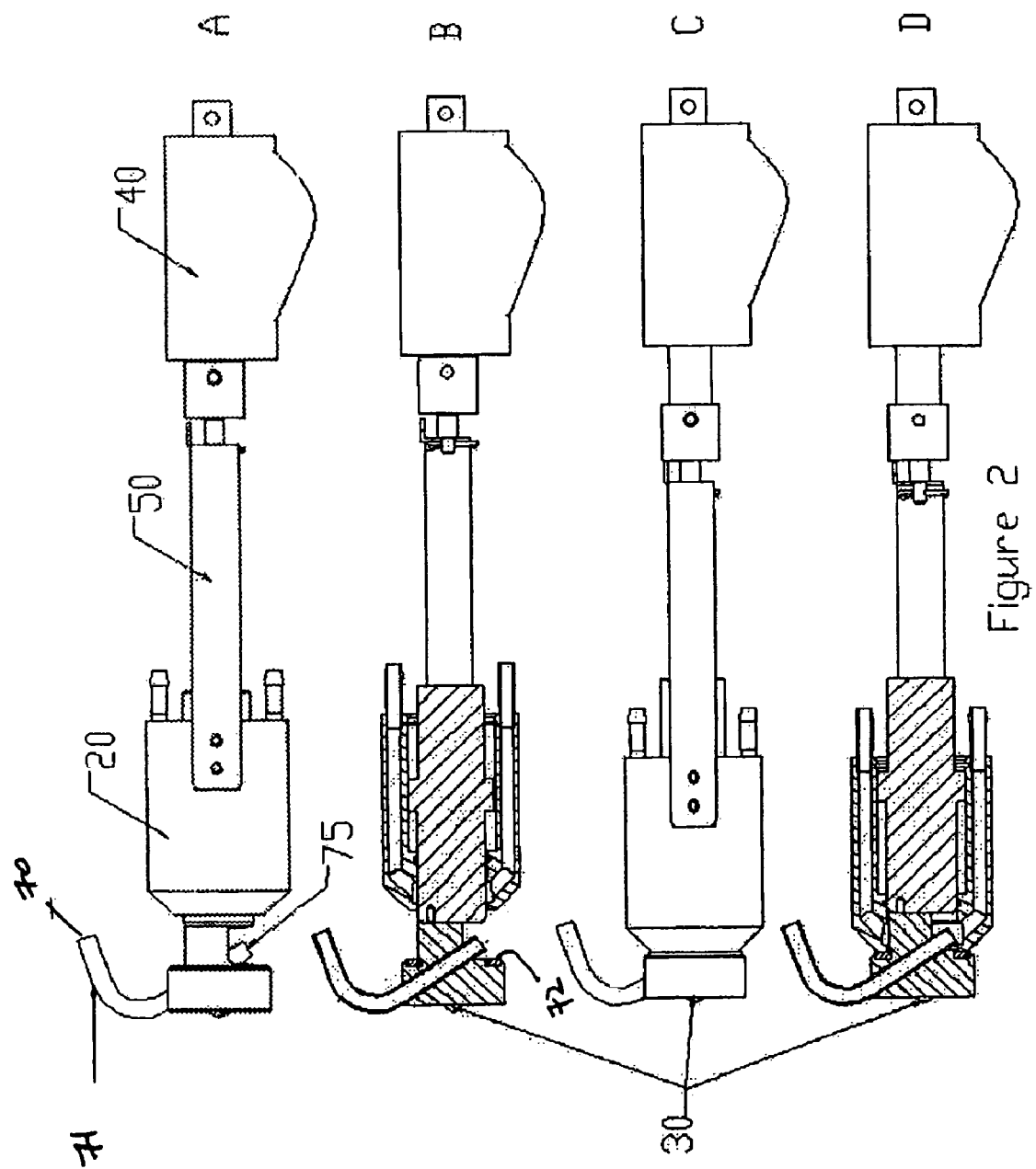
FIG. 2a illustrates a perspective view of an embodiment of the dispensing device in an open, beverage dispensing position.
FIG. 2b illustrates a partial cross-section view of an embodiment of the dispensing device in an open, beverage dispensing position.
FIG. 2c illustrates a perspective view of an embodiment of the dispensing device in a closed, cleaning position.
FIG. 2d illustrates a partial cross-section view of an embodiment of the dispensing device in a closed, cleaning position.

Referring now to FIG. 2, illustrated are side views and partial cross section views of an embodiment of the nozzle assembly in an open and a closed position. FIGS. 2a and 2b illustrate the open or dispensing position of the nozzle. FIGS. 2c and 2d illustrate the closed or cleaning position of the nozzle.

As illustrated in FIG. 2a, cylinder 20 of the nozzle assembly is in a position that is spaced apart from dispenser head 30. In this position nozzle outlet 75 is exposed and a beverage product can be introduced into inlet port 70, pass through tube 71, and would then be dispensed through outlet 75, for example into a cup positioned beneath outlet 75.

A cross section of the beverage pathway can be seen in more detail by reference to FIG. 2b. FIG. 2b illustrates that the path of the beverage product is substantially direct through nozzle head 30 to outlet 75.

As illustrated in FIG. 2c, cylinder 20 of the nozzle assembly is positioned such that it is next to or in contact with dispenser head 30. In this "closed" position, nozzle outlet 75 is covered by cylinder 20 and can no longer directly dispense a beverage. An annular chamber is thus created from the closing of head 30 and cylinder 20, which becomes sealed with respect to the outside and which encompasses the beverage outlet 75. At least one seal 72 is preferably provided between the surfaces of contact of the dispenser head and cylinder 20.

The internal flow pathway of the nozzle in the closed position is illustrated in FIG. 2d. In the closed position the flow pathway through the nozzle does not change. However, a conduit in the cylinder is in position to receive the fluid that passes through the dispenser head. Thus, when the nozzle is in the closed position a cleaning solution can be passed through tube 71 of the dispensing head 30 and will enter the conduit in the cylinder. The fluid that enters the conduit can then be directed to waste or to recirculate by flow lines (not shown) that attach to a port on the conduit.

In the embodiment illustrated in FIG. 2, cylinder 20 is moved with respect to dispensing head 30 by actuator 40 which is attached to cylinder 20 through mounting bracket 50.

The actuator is capable of positioning the cylinder in either the open position as illustrated in FIGS. 2a and 2b or in the closed position illustrated by FIGS. 2c and 2d.

Figure 3:
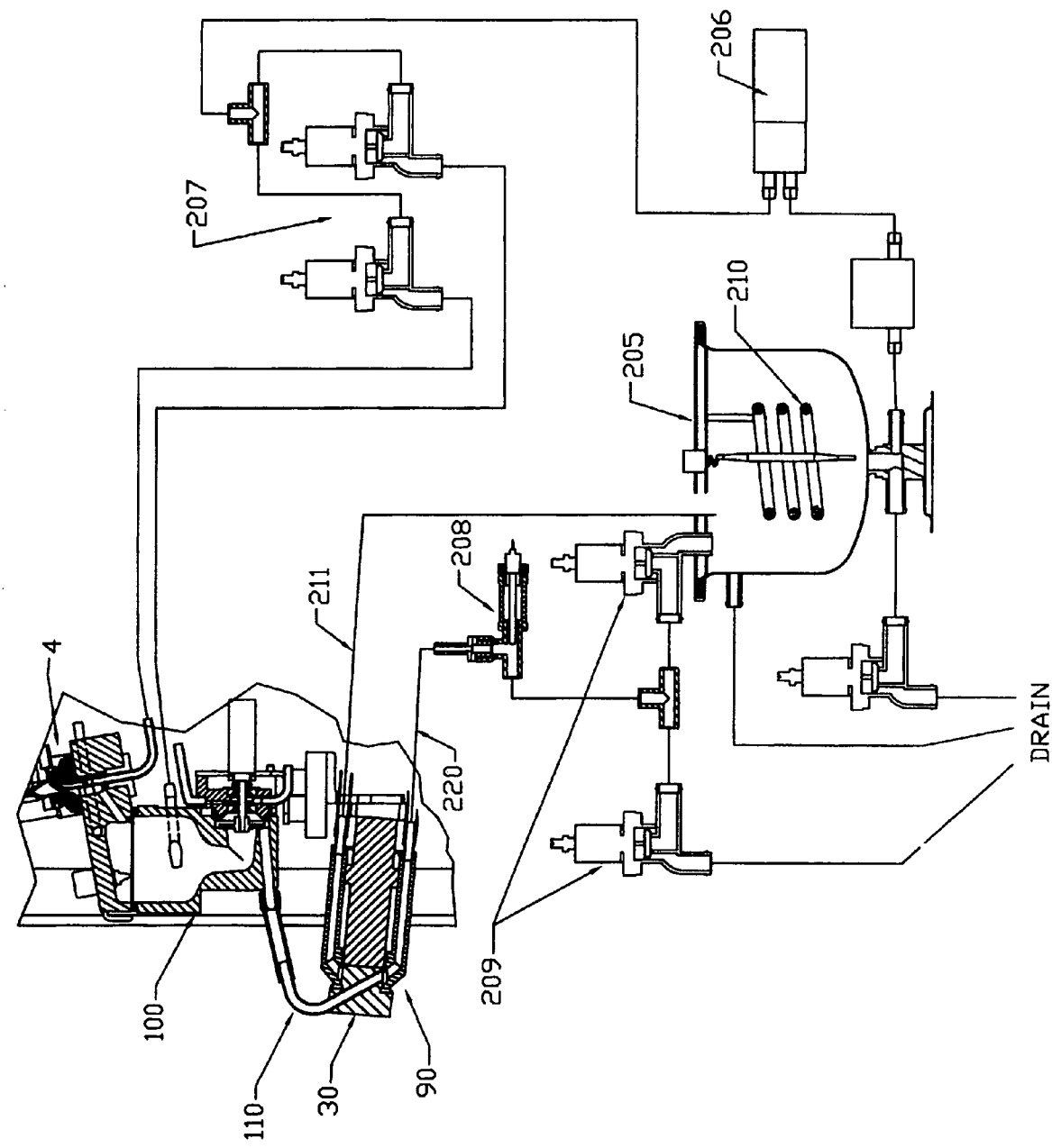
FIG. 3 illustrates a cross-section view and partial schematic view of the dispensing device of FIG. 1 in the closed, cleaning position with drain paths.

FIG. 3 illustrates the arrangement of nozzle 90 within an embodiment of the dispenser; particularly with respect to whipping assembly 100 and the clean-in-place recirculation and draining paths. By way of example and not limitation, the dispenser can operate as follows:

As illustrated in FIG. 3, the beverage flow path comes directly from the whipping assembly 100 to dispensing head 30. The pathway from whipping assembly 100 to dispenser head 30 is completed by a flexible tubing 110 which is connected to tube 71 of dispenser head 30. Beverage tubing 110 making the connection between the whipping assembly and dispenser nozzle is connected to a preferably rigid, tube 71, fixedly connected to the dispenser head, and the product flow pathway is preferably, substantially directly through dispenser head 30 to the outlet port 75. Preferably, the head's tubing 71 is rigid, such as a hard plastic or metal tubing, such as stainless steel tubing.

One advantage of this configuration is that the angles in the flow pathway between whipping assembly 100 and dispenser head 30 are relatively direct, as compared to prior devices. As illustrated in FIG. 3, the product pathway through tubing 71 makes a progressive bend from the whipping tubing 110 or whipping outlet to dispenser head 30 with about a 90 degree angle, preferably, an angle of more than 90 degrees. The tube being also preferably rigid, the bend remains, at all times, at the same angle and squeezing or twisting of the tube cannot occur. Therefore, foam is gently transported from whipping assembly 100 to the dispenser head 30. The straighter product path from the present new design helps to preserve the integrity of the foam after its creation in the whipping assembly. Furthermore, the end of the tube is oriented inwardly with a certain angle to direct the beverage to the side of the receiving vessel to further soften foam delivery and maintain foam integrity. In addition, the shorter and smoother pathway to the receiving vessel reduces the delivery time and opportunity for food residue to settle and bacteria to grow.

Another improvement to the design of the nozzle assembly lies in the upper venting and/or draining channel(s) 60. This channel alleviates difficulties in evacuating the chamber during cleaning. In the present novel design of FIG. 3, a cleaning solution can drain through both the lower and upper channels insuring that all the internal surfaces of the nozzle are cleaned and that no food product contact surfaces are left at risk of contamination.

The present design also avoids the use of long tubing for connecting the whipping assembly to the dispenser head because in the present design the dispenser head is anchored to the frame of the food dispenser and cylinder 20 moves with respect to the dispenser head piston assembly. Because the positions of both the dispenser head and whipping assembly are fixed in a single position, they can be joined by a tube of fixed (exact) length. Non-moving tubes avoid risks present with moving flexible tubes which can fold and form creases which can interfere or stop product or cleaning fluid flow. Folding can also create areas within the tubing where solid residue can more easily settle.

As indicated previously and illustrated in FIG. 3, the nozzle assembly and whipping assembly are mounted in a food dispensing device. These assemblies are configured with a clean-in-place flow system for cleaning all surfaces in the whipping assembly and in the nozzle assembly that come into contact with food products.

In an embodiment, the clean-in-place system can include a tank 205 which can contain a heater 210 to heat cleaning solution such as water to suitable rinsing or sanitizing temperatures. The cleaning or sanitizing fluids can be circulated through the circulation path by a pump 206 to valves 207 where the flow can be diverted to clean a product interface 4 and food contact surfaces in whipping assembly 100. A portion of the cleaning fluid can then flow from the whipping assembly into the dispenser head 30 to clean nozzle assembly 90. With respect to nozzle assembly 90, the cleaning occurs with the nozzle in the closed position, as illustrated. In this nozzle head configuration, the fluid will flow through the channels in the nozzle assembly to further cleanse the nozzle. A portion of the cleaning fluid will flow from the lower channel into fluid line 220 to a temperature sensor 208, then to a "T" connection which diverts the flow to two valves 209; one which leads to a drain, the other which leads fluid back to tank 205 for recirculation (e.g., CIP or auto rinse). Cleaning fluid can also flow from the top channel of the nozzle 202 and back to tank 205 through fluid line 211 and can be recirculated.

Nozzle assembly 90 is mounted in a food dispenser which can be controlled by a microprocessor to automatically initiate cleaning using the method disclosed above at least once a day. Thus, adequate sanitation of the food contact surfaces within the food dispenser can be maintained by using the presently disclosed compositions and methods.

The system can be programmed such that at periodic intervals (e.g., every 2 hours) a cleaning program will automatically initiate to cleanse all food contact surfaces throughout the food dispensing machine including those surfaces in whipping assembly 100, and dispensing nozzle assembly 90 with a cleaning solution, such as hot water from the boiler. Suitable water temperatures include temperatures that can sufficiently clean and sanitize the dispenser. Temperatures of about 150° F. or more are typically used, more preferably temperatures of about 175° F. or more and still more preferably temperatures of about 190° F. or more, or even 200° F. or more can be used. The system can be programmed such that adequate times and temperatures must be sensed by temperature sensors, such as sensor 208 at the drain inlet, or the system will reinitiate the cleaning process for a predetermined number of attempts, such as 2 attempts. If the time/temperature conditions are not met, a fault can be generated and displayed on the operator panel. Such an "autorinse" operation could also be manually started from the operator panel.

The system can also be programmed such that a timer is set upon the completion of the clean-in-place program. Then, if an operator does not complete another cleaning cycle within a certain period of time, for example within the following 28 h, the system could be programmed to initiate a dispensing lockout until a clean-in-place cycle is completed.

By way of example and not limitation, a daily clean-in-place cycle can be as follows:
  Pre-rinse all food product contact surfaces with water having a defined temperature for defined amount of time,
  Clean all contact surfaces with mild cleaning composition such as an alkali detergent or surfactant, and
  Post-rinse all contact surfaces to remove product residues and sanitize the system.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A nozzle for a beverage dispensing device comprising:
   a dispensing head comprising a beverage delivery outlet and a cylinder; wherein at least one of said head or cylinder is moveable relative to each other for encompassing, in a cleaning position, the beverage delivery outlet and diverting a flowpath to at least one drain port for draining liquid; and
   wherein the dispensing head is traversed by a portion of a beverage conduit, that is substantially straight along an entire length from a top of the dispensing head to a bottom of the dispensing head up to the beverage delivery outlet.

2. The nozzle for a beverage dispensing device of claim 1, wherein the cylinder comprises two vertically spaced apart drain conduits.

3. The nozzle for a beverage dispensing device of claim 1, wherein the portion of the beverage conduit is a rigid tube.

4. The nozzle for a beverage dispensing device of claim 3, wherein the portion of the beverage conduit is a part of the beverage conduit which extends upwardly beyond the dispenser head.

5. The nozzle for a beverage dispensing device of claim 4, wherein the beverage conduit has a bend with an angle of no less than about 90 degrees.

6. A nozzle for a dispensing device comprising:
   a dispensing head traversed by a flow pathway that is substantially straight from a top to a bottom of the dispensing head;
   a cylinder; and
   a piston, wherein the piston and the dispensing head are joined and housed within the cylinder such that the cylinder can be moved with respect to an assembly to position the dispensing head in a dispensing position and a cleaning position.

7. The nozzle for the dispensing device of claim 6, wherein the piston is fastened to a frame.

8. The nozzle for the dispensing device of claim 6, wherein the cylinder comprises at least one port through which a cleaning fluid can flow.

9. The nozzle for the dispensing device of claim 6, wherein the cylinder comprises at least two ports through which a cleaning fluid can flow.

10. A nozzle for a dispensing device comprising:
    a dispensing head traversed by a flow pathway that is substantially straight from a top to a bottom of the dispensing head;
    an actuator;
    a cylinder; and
    a piston, wherein the cylinder is mounted to the actuator, and wherein the piston and the dispensing head are joined in an assembly and housed within the cylinder such that the actuator is capable of moving the cylinder with respect to the assembly to position the dispensing head in a dispensing position and a cleaning position.

11. The nozzle for the dispensing device of claim 10, wherein an actuator can move the cylinder between at least two positions such that the dispensing head can be in the dispensing position or the cleaning position.

12. A beverage dispensing device comprising:
    a nozzle for a dispensing device comprising a dispensing head wherein the dispensing head is traversed by a portion of a flow pathway that is substantially straight along an entire length from a top of the dispensing head to a bottom, wherein the nozzle further comprises
    an actuator,
    a cylinder, and
    a piston, wherein the cylinder is mounted to the actuator, and wherein the piston and the dispensing head are joined in an assembly and housed within the cylinder such that the actuator is capable of moving the cylinder with respect to the assembly to position the dispensing head in a dispensing position and a cleaning position.

13. The dispensing device of claim 12, wherein the cylinder of the nozzle comprises a cleaning fluid drain port which can receive cleaning fluid from the dispenser head.

14. The dispensing device of claim 12, wherein the cylinder of the nozzle comprises two ports which can receive a cleaning fluid.

* * * * *